Jan. 21, 1958 R. W. BORN 2,820,415
LOW PRESSURE, HIGH VOLUME – HIGH PRESSURE, LOW VOLUME PUMP
Filed March 12, 1956
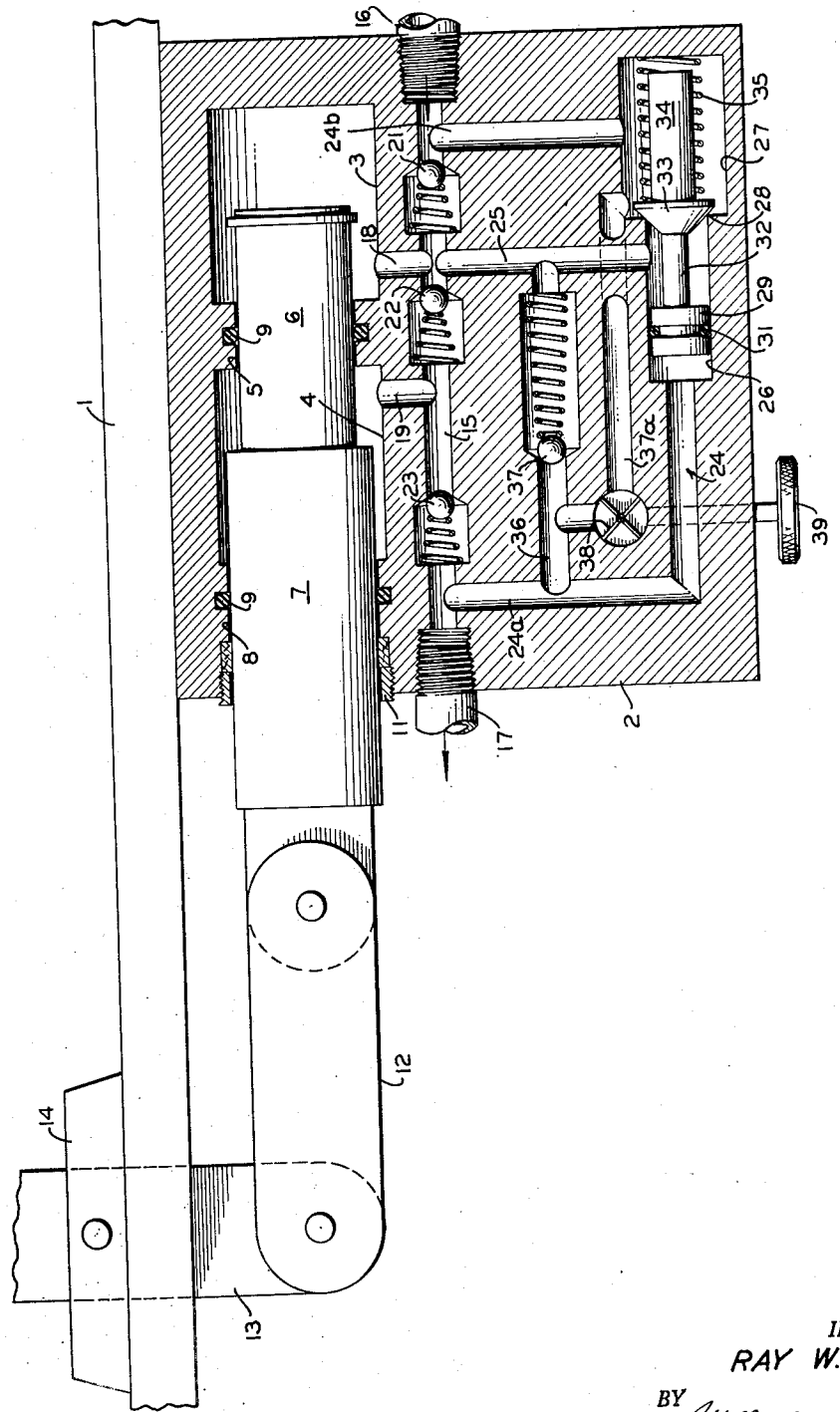
INVENTOR.
RAY W. BORN
BY
ATTORNEYS

United States Patent Office 2,820,415
Patented Jan. 21, 1958

2,820,415

LOW PRESSURE, HIGH VOLUME—HIGH PRESSURE, LOW VOLUME PUMP

Ray W. Born, El Monte, Calif.

Application March 12, 1956, Serial No. 570,935

3 Claims. (Cl. 103—37)

This invention relates to and in general has for its object the provision of a pump for actuating hydraulic lifts and the like, wherein it is desirable to shift from a low pressure, high volume system to a high pressure, low volume system, depending upon the load conditions imposed upon the lift.

More specifically, the object of this invention is the provision of a dual stage pump, including a low pressure, high volume stage and a high pressure, low volume stage, wherein means is provided for short-circuiting the low pressure, high volume stage in response to the imposition on the pump of a working load pressure greater than a predetermined pressure.

The invention possesses other advantageous features, some of which, with the foregoing, will be set forth at length in the following description where those forms of the invention which have been selected for illustration in the drawings accompanying and forming a part of the present specification, are outlined in full. In said drawings, one form of the invention is shown, but it is to be understood that it is not limited to such form, since the invention as set forth in the claims may be embodied in other forms.

The single figure shown in the accompanying drawing is a diagrammatic illustration of a pumping system embodying the objects of my invention.

As so illustrated, my system includes a frame 1 supporting a pump body 2. Formed in the body 2 is a high volume cylinder 3 in axial alignment with a low volume cylinder 4 separated intermediate their adjoining ends by an inwardly extending, annular bearing member 5 having an internal diameter substantially smaller than the internal diameter of the cylinders 3 and 4.

Operatively disposed within the cylinder 3 and having a running fit with the bearing 5 is a small piston 6 formed integral and coaxial with a large piston 7 extending through one end of the valve body 2 and having a running fit with an annular bearing 8. Disposed in the bearings 5 and 8 are conventional seals 9, and disposed in the pump body 2 is a conventional packing ring 11.

Pivoted to the free end of the piston 7 is a link 12 pivoted to one end of an operating lever 13, this lever being pivoted intermediate its ends to a pair of transversely spaced ears 14 formed integral with the frame 1.

Extending through the valve body 2 adjacent and parallel to the cylinders 3 and 4 is a first fluid line 15 having an upstream inlet end 16 and a downstream outlet end 17. Connecting the line 15 with the cylinder 3 is a first conduit 18, and similarly connecting the line 15 with the cylinder 4 is a second conduit 19.

Disposed in the line 15 upstream of the conduit 18 is a first spring biased ball check valve 21 for preventing the upstream passage of fluid in the line 15 from the cylinder 3. Located in the line 15 between the conduits 18 and 19 is a second check valve 22 identical with the valve 21, and which precludes the upstream passage of fluid from the cylinder 4. Similarly preventing the upstream passage of fluid in the line 15 from its downstream end 17 is a spring biased ball check valve 23.

Connecting the downstream and upstream ends 17 and 16, respectively, of the first fluid line 15 is a second fluid shunt line, designated generally at 24, and comprising a passage 24a connected to the downstream end 17 of the first fluid line 15 and terminating in an enlarged bore piston cylinder 26 which opens at its other end into a yet larger bore valve chamber 27, which, in turn, is connected by passage 24b to the upstream end 16 of the first fluid line 15. A valve seat 28 is formed at the juncture of the piston cylinder 26 and valve chamber 27. Slidably mounted within piston cylinder 26 is a piston 29, having a seal ring 31 circumferentially recessed therein. A piston rod 32 extends forwardly from piston 29 and carries thereon a tapered valve closure member 33 arranged to close on the valve seat 28. Formed integrally and coaxially with closure member 33 is a pin 34, and surrounding said pin is a compression spring 35 arranged to seat at one end thereof on closure member 33 and at its opposite end on the end wall of valve chamber 27 to normally seat closure member 33 on the valve seat 28. A third conduit 25 extends from the first fluid line 15, intermediate the check valves 21 and 22 therein, to the second fluid line 24, forming a juncture therewith at the piston cylider 26 between the piston 29 and the valve seat 28. As a result of this structure, the piston and its closure member 33 can move to the right only provided that the fluid pressure on the left end of the piston is sufficient to overcome the biasing pressure of the spring 35. If and when this takes place, communication will be established through the valve chamber 27 between the third conduit 25 and the right hand end 24b of the second fluid line 24.

Extending between the left hand end of the line 24 and the third conduit 25 is a relief valve line 36, and mounted therein is a spring-biased ball check relief valve 37 arranged to open in response to a sufficiently high pressure in the line 36 in the direction of the conduit to overcome the spring-biasing pressure of the spring associated with the valve 37.

Establishing communication between the line 36 and the valve chamber 27 is a fourth conduit 37a, and incorporated therein is a bleed valve 38 arranged to be externally operated by an external control handle 39.

*Operation*

Assuming that the upstream end 16 of the line 15 is connected with a source of working fluid, it will be seen that the intake stroke of the pistons 6 and 7 will result in drawing fluid through the check valves 21 and 22, respectively, into the cylinders 3 and 4. On the working stroke of the pistons, the fluid contained in the cylinders 22 and 23 will be forced back into the line 15, but due to the check valves 22 and 23 can flow only downstream through the downstream opening check valve 23. Here it should be noted that the displacement of the cylinder 3 should be substantially greater than the displacement of the cylinder 4. Displacements in the proportionate order of 1.25 cu. in. per stroke to .474 cu. in. per stroke have been found to be satisfactory in connection with some hydraulic lifts. Although most of the fluid will travel through the downstream end 17 of the line 15 to a hydraulic lift connected therewith, some of the fluid will fill each of the other lines and conduits insofar as the valves associated therewith will permit. When, however, a back load is imposed on the downstream end 17 of the line 15, the pressure therein may be built up to a point wherein it is greater than the pressure of the spring 35, and when that takes place, communication will immediately be established between the third conduit and the right hand end 24a of the line 24, as above described. As a result of this, the high volume pump constituted by the cylinder 3 and the piston 6 is in effect deactivated, for although of necessity it must continue to operate, the fluid pumped out of the cylinder 3 follows the path of least resistance and therefore travels down the conduit 25 past the open valve member 33, through the chamber 27, and from there back to the upstream end 16 of the line 15. When this has taken place it is only the pump constituted by the cylinder 4 and the piston 7 which is effective in forcing the working medium downstream and to the hydraulic lift. This latter pump, however, because of its construction serves as a low volume, high pressure pump.

When the back pressure at the downstream end of the line 15 falls below the pressure of the spring 35, the closure member 33 will be forced into engagement with the valve seat 28, thus closing off this end of the circuit and therefore again permitting the high volume pump to pump working medium through the line 15.

If it be desired to bleed the downstream end of the line 15 so as to lower the pressure, the operator need only open the valve 38.

If the pressure on this end of the line becomes abnormally high it will cause the relief valve 37 to open after the closure member 33 has moved to its open position, thereby short-circuiting the low volume pump as well as the high volume pump.

I claim:

1. A pumping system comprising: a first high displacement piston pump operating in unison with a second low displacement piston pump; a first fluid line having upstream and downstream ends; a first conduit for connecting said first fluid line with said first pump; a second conduit for connecting said first fluid line with said second pump at a point downstream of said first conduit; a first check valve disposed in said first fluid line upstream of said first conduit; a second check valve disposed in said first fluid line between said first and second conduits; a third check valve disposed in said first fluid line downstream of said second conduit; a second fluid line connecting said first fluid line at a point upstream of said first check valve with said first fluid line at a point downstream of said third check valve; a third conduit connecting said first fluid line at a point intermediate said first and second check valves with said second fluid line intermediate the ends thereof; a spring biased piston slide valve disposed in said second fluid line at the juncture thereof with said third conduit normally serving to close off said second fluid line on both sides of said juncture, but to establish communication between said third conduit and the upstream side of said first fluid line in response to an increase in the fluid pressure of the downstream end of said first fluid line above the bias of the spring of said piston slide valve; a fourth conduit connecting said first fluid line at a point downstream of said third check valve with said second fluid line at a point intermediate the ends thereof; and an externally operable valve disposed in said fourth conduit, said first, second, and third check valves being spring biased and serving to prevent the upstream flow of fluid in said first fluid line.

2. A pumping system comprising: a first high displacement piston pump connected in unison with a second low displacement pump; a first fluid line having an upstream and a downstream end; a first conduit connecting said first pump and said first fluid line; a second conduit connecting said second pump and said first fluid line at a point downstream from said first conduit; a first check valve in said first fluid line upstream of said first conduit; a second check valve in said first fluid line between said first and second conduits; a third check valve in said first fluid line downstream of said second conduit, said first, second and third check valves each preventing upstream flow of fluid in said first fluid line; a third conduit connected to said first fluid line intermediate said first and second check valves; a second fluid line connected to said first fluid line upstream of said first check valve; a normally closed valve connecting said third conduit and said second fluid line, said normally closed valve being openable to establish fluid flow from said third conduit to said second fluid line; and means responsive to a predetermined fluid pressure in said first fluid line downstream of said third check valve for opening said normally closed valve.

3. A pumping system comprising: a first high displacement piston pump connected in unison with a second low displacement piston pump; a first fluid line having an upstream end and a downstream end; a first conduit connecting said first fluid line with said first pump; a second conduit connecting said first fluid line with said second pump at a point downstream of said first conduit; a first check valve disposed in said first fluid line upstream of said first conduit; a second check valve disposed in said first fluid line between said first and second conduits; a third check valve disposed in said first fluid line downstream of said second conduit, said first, second and third check valves being spring biased and serving to prevent the upstream flow of fluid in said first fluid line; a second fluid line connecting said first fluid line at a point upstream of said first check valve with said first fluid line at a point downstream of said third check valve; a third conduit connecting said first fluid line at a point intermediate said first and second check valves with said second fluid line intermediate the ends thereof; and a spring biased piston slide valve disposed in said second fluid line at the juncture thereof with said third conduit normally serving to close off said second fluid line on both sides of said juncture, but to establish communication between said third conduit and the upstream side of said first fluid line in response to an increase in the fluid pressure of the downstream end of said first fluid line above the bias of the spring of said piston slide valve.

References Cited in the file of this patent

UNITED STATES PATENTS

| | | |
|---|---|---|
| 1,046,073 | Joyce | Dec. 3, 1912 |
| 2,152,715 | Van Cleave | Apr. 4, 1939 |
| 2,372,375 | Groves | Mar. 27, 1945 |
| 2,610,025 | Mueller | Sept. 9, 1952 |
| 2,659,307 | Framhein | Nov. 17, 1953 |
| 2,673,521 | Huber | Mar. 30, 1954 |